(12) United States Patent
Tarrant et al.

(10) Patent No.: US 9,276,266 B1
(45) Date of Patent: Mar. 1, 2016

(54) PERFORATED ELECTRODE PLATE

(71) Applicant: Zinc Air Incorporated, Columbia Falls, MT (US)

(72) Inventors: Derek C. Tarrant, Kalispell, MT (US); Paul A. Trudeau, Jr., Kalispell, MT (US)

(73) Assignee: VIZN ENERGY SYSTEMS, INCORPORATED, Columbia Falls, MT (US)

( * ) Notice: Subject to any disclaimer, the term of this patent is extended or adjusted under 35 U.S.C. 154(b) by 540 days.

(21) Appl. No.: 13/724,012

(22) Filed: Dec. 21, 2012

(51) Int. Cl.
*H01M 4/86* (2006.01)
*H01M 8/18* (2006.01)
*H01M 4/76* (2006.01)
*H01M 4/74* (2006.01)

(52) U.S. Cl.
CPC ............ *H01M 4/8626* (2013.01); *H01M 8/184* (2013.01); *H01M 4/742* (2013.01); *H01M 4/762* (2013.01)

(58) Field of Classification Search
CPC ..... H01M 4/742; H01M 4/762; H01M 8/184; H01M 4/8626
USPC ......................................................... 429/241
See application file for complete search history.

(56) References Cited

U.S. PATENT DOCUMENTS

| | | |
|---|---|---|
| 3,974,049 A | 8/1976 | James et al. |
| 4,210,512 A | 7/1980 | Lawrance et al. |
| 4,652,504 A | 3/1987 | Ando |
| 4,722,773 A | 2/1988 | Plowman et al. |
| 5,542,958 A | 8/1996 | Furukawa |
| 5,849,430 A * | 12/1998 | Lee ................................. 429/94 |
| 6,063,525 A | 5/2000 | LaFollette |
| 7,964,301 B2 | 6/2011 | Fischel et al. |
| 7,976,982 B2 | 7/2011 | Nakamura et al. |
| 8,125,767 B2 | 2/2012 | Marumo et al. |
| 8,974,940 B1 | 3/2015 | Tarrant |
| 2003/0143466 A1 | 7/2003 | Goda et al. |
| 2009/0258278 A1 | 10/2009 | Steinberg |
| 2010/0035150 A1* | 2/2010 | Ando et al. .................... 429/209 |
| 2010/0108537 A1 | 5/2010 | Perego et al. |
| 2011/0027621 A1 | 2/2011 | Deane et al. |
| 2011/0114496 A1 | 5/2011 | Dopp et al. |
| 2011/0117456 A1* | 5/2011 | Kim et al. ...................... 429/406 |
| 2011/0200848 A1 | 8/2011 | Chiang et al. |
| 2011/0223451 A1 | 9/2011 | Winter et al. |
| 2011/0244277 A1* | 10/2011 | Gordon et al. .................. 429/51 |
| 2012/0052347 A1 | 3/2012 | Wilson et al. |
| 2013/0049692 A1* | 2/2013 | Kuhs .............................. 320/127 |
| 2013/0065122 A1* | 3/2013 | Chiang et al. ................. 429/211 |

OTHER PUBLICATIONS

Andere Bakker et al., "Laminar Flow in Static Mixers with Helical Elements", Updated Feb. 15, 2000—Published in "The Online DVM Book" at http:www.bakker.org.cfm., Copyright 1998 Andre Bakker, pp. 1-11.

(Continued)

*Primary Examiner* — Jeremiah Smith
(74) *Attorney, Agent, or Firm* — Brooks Kushman P.C.

(57) ABSTRACT

An energy storage includes a cell that defines a flow chamber for receiving electrolyte, and an electrode arrangement positioned in the cell. The electrode arrangement includes a plate having first and second sides. The plate further has multiple openings that vary in size to facilitate electrolyte flow on both sides of the plate.

24 Claims, 3 Drawing Sheets

(56) References Cited

OTHER PUBLICATIONS

Ross Online, Static Mixers for Process Industry Applications—"Static Mixer Designs and Applications" and "Innovation in Motionless Mixers", http://staticmixers.com/, Jun. 6, 2012, 21 pages total.

"Mixing Arrangement for a Flow Cell of an Energy Storage System"—U.S. Appl. No. 13/724,315, filed Dec. 21, 2012.

Notice of Allowance Dated Jul. 17, 2015, U.S. Appl. No. 13/724,315.

* cited by examiner

PERFORATED ELECTRODE PLATE

TECHNICAL FIELD

The disclosure relates to an electrode for an energy storage system including one or more cells.

BACKGROUND

An energy storage system, such as a flow battery, may include one or more cells that operate to store energy provided from a source, and to discharge energy to a device to do work. Each cell may have a cathode, an anode and a separator disposed between the cathode and anode for separating chambers of the cell that receive electrolytes. The separator may permit ionic flow between the cathode and anode to facilitate energy storage in the system, as well as discharge of energy from the system.

SUMMARY

An energy storage system according to the present disclosure includes a cell that defines a flow chamber for receiving electrolyte, and an electrode arrangement positioned in the cell. The electrode arrangement includes a plate having first and second sides. The plate further has multiple openings that vary in size to facilitate electrolyte flow on both sides of the plate.

An electrode arrangement is also provided for use with an energy storage system having a cell that defines a flow chamber for receiving electrolyte. The electrode arrangement includes a plate that is positionable in the cell. The plate has first and second sides and multiple openings that vary in size such that the plate is configured to facilitate electrolyte flow on both sides of the plate when the plate is positioned in the cell.

While exemplary embodiments are illustrated and disclosed, such disclosure should not be construed to limit the claims. It is anticipated that various modifications and alternative designs may be made without departing from the scope of the invention.

DETAILED DESCRIPTION

The present disclosure describes various configurations of energy storage systems and components thereof. Several specific embodiments are set forth in the following description and in FIGS. 1-7 to provide a thorough understanding of certain embodiments according to the present disclosure. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. Furthermore, as those of ordinary skill in the art will understand, one or more features of an embodiment illustrated and described with reference to any one of the Figures may be combined with one or more features illustrated in one or more other. Figures to produce embodiments that are not explicitly illustrated or described. In addition, other embodiments may be practiced without one or more of the specific features explained in the following description.

Figure 1:
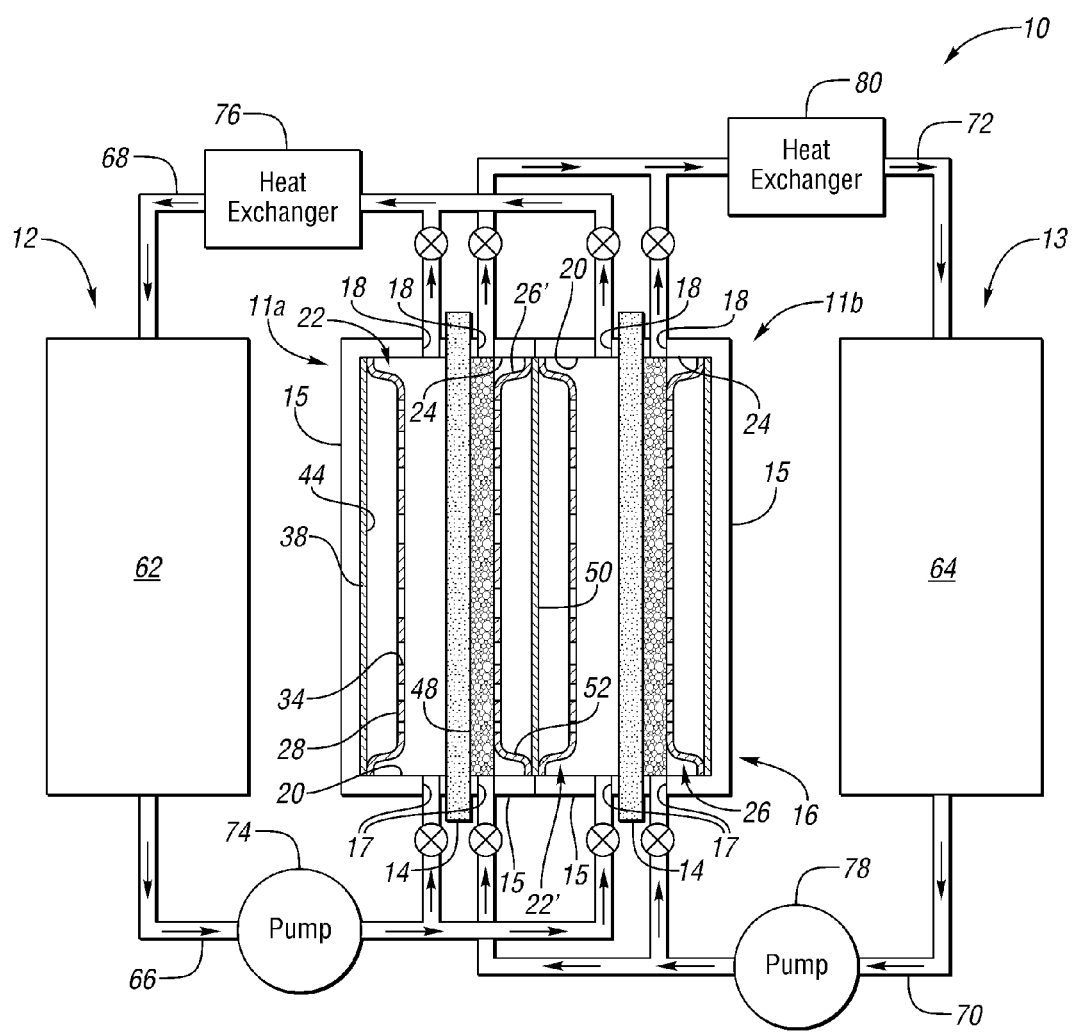
FIG. 1 is a schematic view of an energy storage system, according to the present disclosure, including first and second cells that each have first and second flow chambers, an anode arrangement associated with the first flow chamber, a cathode arrangement associated with the second flow chamber, and a separator between the anode arrangement and the cathode arrangement, wherein each anode arrangement and each cathode arrangement includes a base plate having multiple openings that vary in size.

FIG. 1 shows an energy storage system 10 according to the present disclosure. In the illustrated embodiment, the system 10 is configured as an electrochemical flow battery that is operable to store energy received from a source, and to discharge energy to one or more devices to do work. For example, the system 10 may be used in electrical utility applications for load leveling, power transmission deferral, wind power integration, and/or solar power integration.

The system 10 shown in FIG. 1 includes first and second flows cells 11*a* and 11*b*, respectively, that are joined together in a cell stack, and first and second electrolyte supply arrangements 12 and 13, respectively, for supplying electrolytes to the cells 11*a* and 11*b* such that the system 10 forms an electrochemical reactor, as explained below in greater detail. Although the system 10 is shown with two flow cells 11*a* and 11*b*, the system 10 may be provided with a single flow cell or any suitable number of flow cells that are joined together in a cell stack and that each have the same or similar configuration as described below in detail with respect to the cells 11*a* and 11*b*.

In the embodiment shown in FIG. 1, each cell 11*a*, 11*b* includes first and second cell sides, such as an anode side and a cathode side, which are separated by a separator 14 (e.g., an ion exchange membrane). Each cell side includes a body portion or housing part 15, and the housing parts 15 are connected together to form a sealed body or housing 16. Furthermore, each housing part 15 includes one or more inlets 17 and one or more outlets 18 in fluid communication with a respective electrolyte supply arrangement 12, 13.

Each anode side further includes a first flow field or flow chamber 20 that receives a first electrolyte, such as an anolyte, from the first electrolyte supply arrangement 12, and a first electrode arrangement, such as an anode arrangement 22, 22' according to the present disclosure, associated with the chamber 20. Likewise, each cathode side includes a second flow field or flow chamber 24 that receives a second electrolyte, such as a catholyte, from the second electrolyte supply arrangement 13, and a second electrode arrangement, such as a cathode arrangement 26, 26' according to the present disclosure, associated with the chamber 24. The anode arrangements 22, 22' and the cathode arrangements 26, 26' have a novel configuration for facilitating mixing of the electrolytes, as explained below in detail.

Figure 2:
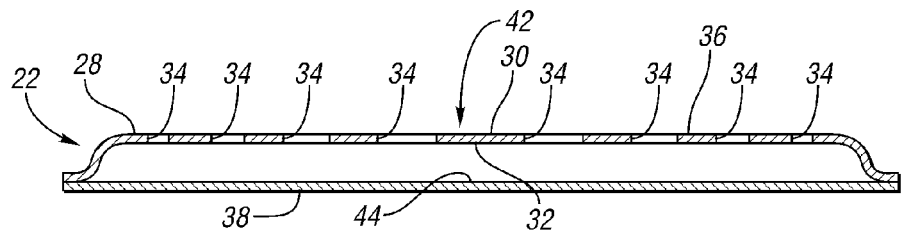
FIG. 2 is an enlarged cross-sectional view of the anode arrangement of the first cell shown in FIG. 1.

Referring to FIGS. 1 and 2, the anode arrangement 22 of the first cell 11a has a base plate 28 having first and second sides 30 and 32, respectively, and multiple openings 34 defined in a generally planar portion 36 of the base plate 28, for example. The anode arrangement 22 further includes a barrier layer 38 attached to the base plate 28. With such a configuration, electrolyte from the first electrolyte supply arrangement 12 is able to flow on both sides 30 and 32 of the base plate 28 to thereby facilitate mixing of the electrolyte.

Figure 3:
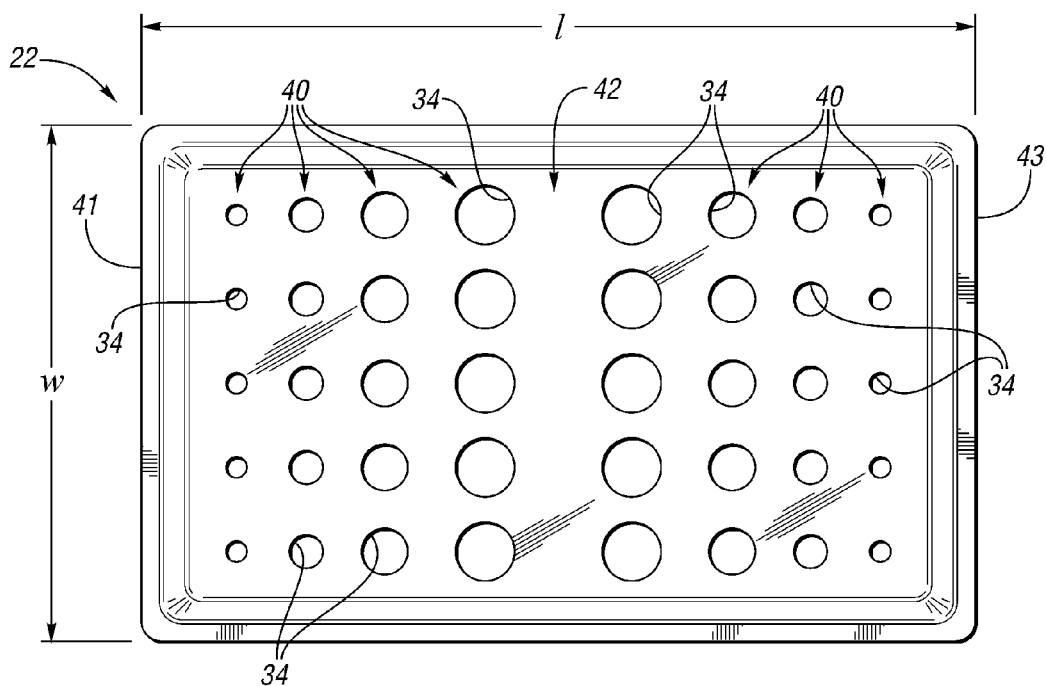
FIG. 3 is a top view of the base plate of the anode arrangement shown in FIG. 2.

As shown in FIGS. 1-3, the openings 34 vary in size across the base plate 28 such that the openings 34 may influence electrolyte flow in a specific manner. For example, the openings 34 may vary in size across a length l of the base plate 28. As a more detailed example, the openings 34 may be arranged in rows 40 that extend across a width w of the base plate 28, and the openings 34 may increase in size from the row 40 located proximate an inlet end 41 of the base plate 28 to the row 40 located proximate a central portion 42 of the base plate 28, on a first side of central portion 42. Furthermore, the openings 34 may decrease in size from the row 40 located on a second side of the central portion 42 to the row 40 located proximate an outlet end 43 of the base plate 28. As another example, the openings 34 may instead increase in size from the row 40 located on a second side of the central portion 42 to the row 40 located proximate the outlet end 43 of the base plate 28. In addition, in the embodiment shown in FIG. 3, the openings 34 in each respective row 40 generally have the same size. As another example, the openings 34 in each respective row 40 may vary in size.

While the openings 34 may have any suitable size and shape, in the embodiment shown in FIG. 3, the openings 34 are generally round or circular with a diameter ranging in size from 0.01 inch to 4 inches. As a more detailed example, the diameter of the openings 34 proximate the inlet end 41 may range in size from 0.1 inch to 0.5 inch, the diameter of the openings 34 proximate the first side of the central portion 42 may range in size from 0.3 inch to 1 inch, the diameter of the openings 34 proximate the second side of the central portion 42 may range in size from 0.3 inch to 1 inch, and the diameter of the openings 34 proximate the outlet end 43 may range in size from 0.1 inch to 0.5 inch. As yet another example, the openings 34 may be oval and/or rectangular in shape.

The above-described barrier layer 38 may be any suitable layer, such as an impermeable membrane or a metal or plastic plate, and may be attached to the base plate 28 in any suitable manner, such as by a welding process and/or with an adhesive. Furthermore, the barrier layer 38 cooperates with the base plate 28 to define an additional flow chamber or cavity 44.

Figure 4:
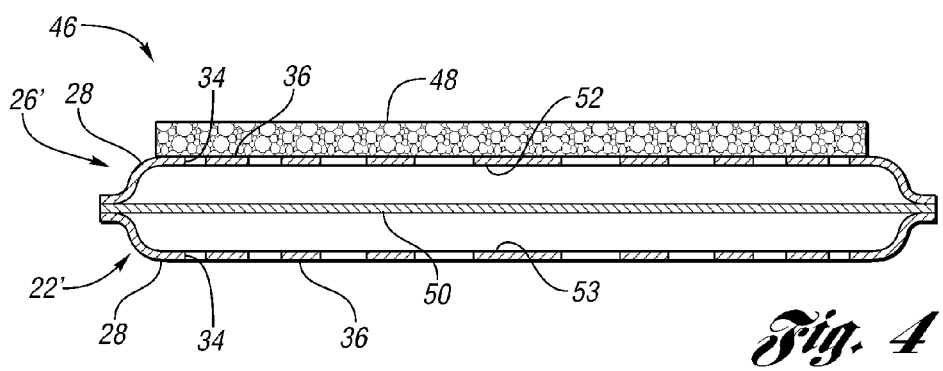
FIG. 4 is an enlarged cross-sectional view of the cathode arrangement of the first cell and the anode arrangement of the second cell shown in FIG. 1, wherein the cathode arrangement and the anode arrangement are provided as a bipolar electrode assembly.

In the embodiment shown in FIGS. 1 and 4, the cathode arrangement 26' of the first flow cell 11a and the anode arrangement 22' of the second flow cell 11b are combined together to form a bipolar electrode assembly 46. The cathode arrangement 26' and the anode arrangement 22' of the electrode assembly 46 each have a perforated base plate 28 having multiple openings 34 formed in a generally planar portion 36 of the respective base plate 28, such as described above with respect to the anode arrangement 22 of the first flow cell 11a. The cathode arrangement 26' of the electrode assembly 46 further includes a flow resistive feature 48, such as metal foam, expanded metal and/or a flow screen, associated with the base plate 28. The flow resistive feature 48 may be attached to the corresponding base plate 28, or positioned adjacent to the base plate 28. Furthermore, the anode arrangement 22' of the electrode assembly 46 may also include a flow resistive feature.

In addition, the electrode assembly 46 includes a barrier layer 50, such as an impermeable membrane or plate, extending between the base plates 28. The barrier layer 50 cooperates with the base plates 28 to define additional flow chambers or cavities 52 and 53, respectively. With such a configuration, electrolyte from the first electrolyte supply arrangement 12 may flow on both sides of the generally planar portion 36 of the base plate 28 of the anode arrangement 22' of the second flow cell 11b, and electrolyte from the second electrolyte supply arrangement 13 may flow on both sides of the generally planar portion 36 of the base plate 28 of the cathode arrangement 26' of the first flow cell 11a.

The cathode arrangement 26 of the second flow cell 11b may have generally the same configuration as the anode arrangement 22 of the first flow cell 11a, except that the cathode arrangement 26 may comprise different materials, as explained below in detail. Furthermore, the cathode arrangement 26 of the second flow cell 11b may also include a flow resistive feature 48, such as described above in detail with respect to the cathode arrangement 26'.

In the multiple cell configuration shown in FIG. 1, all of the associated anode arrangements 22, 22' may communicate electrically and/or ionically, and all of the associated cathode arrangements 26, 26' may also communicate electrically and/or ionically. Furthermore, the endmost electrode arrangements may function as current collectors. In that regard, with the orientation shown in FIG. 1, the leftmost anode arrangement 22 may function to collect current from the other anode arrangement 22' (or anode arrangements 22 or 22' if the system 10 is provided with more than two cells), and the rightmost cathode arrangement 26 may function to collect current from the other cathode arrangement 26' (or cathode arrangements 26 or 26' if the system 10 is provided with more than two cells). The leftmost anode arrangement 22 and the rightmost cathode arrangement 26 may also be electrically connected together to form a circuit.

Figure 5:
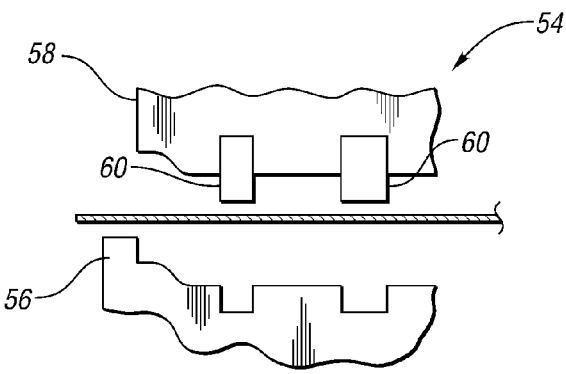
FIG. 5 is a fragmentary side cross-sectional view of a press for making the base plates of the electrode arrangements shown in FIG. 1.

The base plates 28 of the anode arrangements 22, 22' and the cathode arrangements 26, 26' may each be made of any suitable material and in any suitable manner. For example, the base plate 28 of each anode arrangement 22, 22' and each cathode arrangement 26, 26' may be punched, stamped or otherwise cut from a suitable sheet material, such as a steel plate or a plate made of another suitable metal or any other suitable material. Referring to FIG. 5, for example, a press 54 including a first press member, such as a die member 56, and a corresponding second press member, such as a punch member 58 having multiple punch heads 60, may be used to stamp each base plate from sheet stock material, and also punch or otherwise cut each base plate to form the openings 34. The press 54 may also be configured to form a peripheral flange around the perimeter of each base plate 28 for attachment with a respective barrier layer 38, 50 and/or additional base plate 28 of another electrode arrangement. Each base plate 28 may then be plated or otherwise coated with a suitable material. For example, for each anode arrangement 22, 22', the corresponding base plate 28 may be coated with a lead, tin, zinc, or cadmium coating, or other suitable coating. For each cathode arrangement 26, 26', the corresponding base plate 28 may be coated with a nickel coating, or other suitable coating.

If a particular electrode arrangement 22, 22', 26, 26' includes a flow resistive feature 48, the flow resistive feature may then be attached or otherwise associated with the corresponding base plate 28 in any suitable manner. For example, for each cathode arrangement 26, 26', metal foam, such as nickel foam, may be applied onto the corresponding base plate 28. As another example, for each cathode arrangement 26, 26', an expanded metal layer, such as an expanded nickel layer, may be applied onto the corresponding base plate 28. As yet another example, for each electrode arrangement 22, 22', 26, 26', a flow screen may be attached to each corresponding base plate 28, or be positioned adjacent to each corresponding base plate 28 when the electrode arrangement 22, 22', 26, 26' is mounted in a respective cell 11a, 11b.

Alternatively, a flow resistive feature may be applied onto a particular base plate 28 before corresponding openings 34 are formed in the base plate 28. For example, for each cathode arrangement 26, 26', a metal foam layer or an expanded metal layer may be applied onto a base plate 28, and then openings 34 may be formed in the metal layer and the base plate 28 such as by a drilling operation.

Returning to FIG. 1, the electrolyte supply arrangements 12 and 13 are configured to supply electrolytes to the chambers 20 and 24 of the cells 11a and 11b, and the electrolytes function to ionically connect the electrode arrangements of each cell 11a and 11b. The first electrolyte supply arrangement 12 includes a first electrolyte reservoir, such as a anolyte tank 62, in fluid communication with the anode chambers 20 for storing an anolyte, such as an aqueous solution or slurry containing zinc particles, zinc oxide, iron salt, cerium salt, halide, or vanadium oxide; water and alkali metal hydroxide or sulfuric acid; or a non-aqueous solution containing ethylammonium nitrate, imidazolium, sodium hexafluorophosphate, lithium hexafluorophosphate, lithium tetrafluoroborate and/or haloaluminate material or materials. Likewise, the second electrolyte supply arrangement 13 includes a second electrolyte reservoir, such as a catholyte tank 64, in fluid communication with the cathode chambers 24 and configured to store a catholyte, such as an aqueous solution containing an electrochemically reducible iron salt, cerium salt, halide, or vanadium oxide; water and alkali metal hydroxide or sulfuric acid; or a non-aqueous solution containing ethylammonium nitrate, imidazolium, sodium hexafluorophosphate, lithium hexafluorophosphate, lithium tetrafluoroborate and/or haloaluminate material or materials. The anolyte tank 62 may be connected to the housing 16 of the cells 11a and 11b via anolyte supply lines 66 and anolyte return lines 68, and the catholyte tank 64 may be connected to the housing 16 via catholyte supply lines 70 and catholyte return lines 72. Furthermore, the lines 66, 68, 70 and 72, or portions thereof, may be flexible and/or extendable to accommodate opening and closing of the cells 11a and 11b.

The first electrolyte supply arrangement 12 may further include an anolyte circulation pump 74 for moving anolyte between the anolyte tank 62 and the anode chambers 20, a first heat exchanger 76 for controlling temperature of the anolyte, and suitable valves for controlling flow of the anolyte. Likewise, the second electrolyte supply arrangement 13 may include a catholyte circulation pump 78 for moving catholyte between the catholyte tank 64 and the cathode chambers 24, a second heat exchanger 80 for controlling temperature of the catholyte, and suitable valves for controlling flow of the catholyte.

Referring to FIGS. 1-4, operation of the system 10 will now be described in more detail. When the cells 11a and 11b are in a closed position shown in FIG. 1, the system 10 may function in a charge mode or a discharge mode. In the charge mode, the system 10 accepts electrical energy from a source and stores the energy through chemical reactions. In the discharge mode, the system 10 may convert chemical energy to electrical energy, which is released to a load in order to do work. In either mode, each separator 14 may facilitate chemical reactions, such as oxidation and reduction reactions at the electrode arrangements 22, 22', 26, 26' by allowing ions to pass therethrough from one chamber 20, 24 of a respective cell 11a, 11b to the other chamber 20, 24 of the respective cell 11a, 11b.

The electrode arrangement configurations described above may provide numerous benefits during operation of the system 10. First, the openings 34 in the electrode arrangements 22, 22', 26, 26' may facilitate turbulent flow of electrolyte in the chambers 20, 24 to thereby enhance mixing of electrolyte.

Second, the openings 34 in the electrode arrangements 22, 22', 26, 26' may be tailored to achieve desired flow conditions on both sides of the corresponding base plates 28 to thereby reduce concentration gradients of electrolyte components (e.g., ions) from the inlet or inlets 17 to the outlet or outlets 18 of each respective chamber 20, 24. For example, ion rich electrolyte entering a cell inlet or inlets 17 on a first side of a corresponding base plate 28 of a particular electrode arrangement 22, 22', 26, 26' may be allowed to flow to an opposite second side of the base plate 28 via the corresponding openings 34. That relatively ion rich electrolyte may then be allowed to flow back to the first side of the corresponding base plate 28 proximate central portions of the base plate 28 and/or proximate the outlet or outlets 18, such that the relatively ion rich electrolyte may mix with relatively ion deprived electrolyte to thereby facilitate more uniform ion concentrations across the corresponding electrode arrangement 22, 22', 26, 26' from the inlet or inlets 17 to the outlet or outlets 18 of the corresponding chamber 20, 24.

As a more detailed example, and with respect to the cathode arrangement 26' of the cell 11a, the system 10 may be operated such that corresponding anode side of the cell 11a has greater pressure than the corresponding cathode side. Due to the greater anode side pressure, the separator 14 of the cell 11a may be forced firmly onto a surface of the flow resistive feature 48 of the cathode arrangement 26', thereby forcing the electrolyte to flow through gaps or openings of the flow resistive feature 48 (e.g., metal foam interstices), which create resistance to electrolyte flow. As a result of this resistance, a portion of the relatively ion rich electrolyte proximate the inlet or inlets 17 may take an unrestricted path through one or more of the holes 34 in the base plate 28 and into the cavity 52 formed between the base plate 28 and the barrier layer 50, and then flow within the cavity 52 toward the outlet or outlets 18 of the flow chamber 24. In order for that relatively ion rich electrolyte to flow out of the flow chamber 24, it must first flow back to the first side of the corresponding base plate 28 through one or more openings 34 located proximate central portions of the base plate 28 and/or proximate the outlet or outlets 18, for example. As a result, that relatively ion rich electrolyte may mix with relatively ion deprived electrolyte on the first side of the base plate 28.

As another example, and with respect to the anode arrangement 22 of the first cell 11a, as material (e.g., zinc) begins to deposit onto the corresponding base plate 28 through electrochemical reactions during operation of the system 10 (e.g., during a charging operation), the deposited material may act as a flow resistive feature. As a result, a portion of the relatively ion rich electrolyte proximate the inlet or inlets 17 may take an unrestricted path through one or more of the holes 34 in the base plate 28 and into the cavity 44 formed between the base plate 28 and the barrier layer 38, and then flow within the cavity 44 toward the outlet or outlets 18 of the flow chamber 20. That relatively ion rich electrolyte may then be urged to flow, or otherwise allowed to flow, back to the first side 30 of the corresponding base plate 28 through one or more openings 34 located proximate central portions of the base plate 28 and/or proximate the outlet or outlets 18, for example, such that the relatively ion rich electrolyte may mix with relatively ion deprived electrolyte.

The anode arrangement 22 may also be provided with a flow screen or other flow resistive feature proximate the base plate 28 to encourage flow through the openings 34 and into the cavity 44 even in the absence of material being deposited on the base plate 28.

With any of the above electrode arrangements 22, 22', 26, 26', the size of the openings 34 in the corresponding base plate 28 may be tailored to accommodate particular system pressures and/or flow rates to achieve desired electrolyte flow on both sides of the base plate 28. As a result, the electrode arrangements 22, 22', 26, 26' can be configured to achieve desired electrolyte concentration profiles across the corresponding base plates 28.

Figure 6:
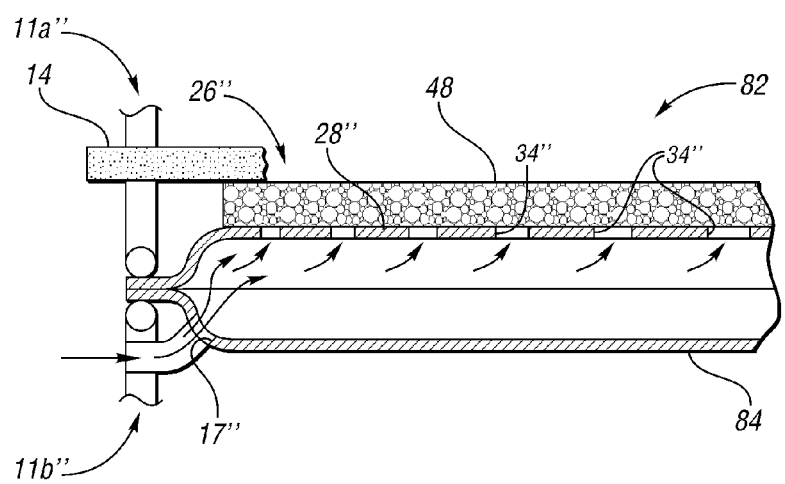
FIG. 6 is an enlarged fragmentary cross-sectional view of another embodiment of an electrode arrangement according to the present disclosure mounted in a cell of an energy storage system.
Figure 7:
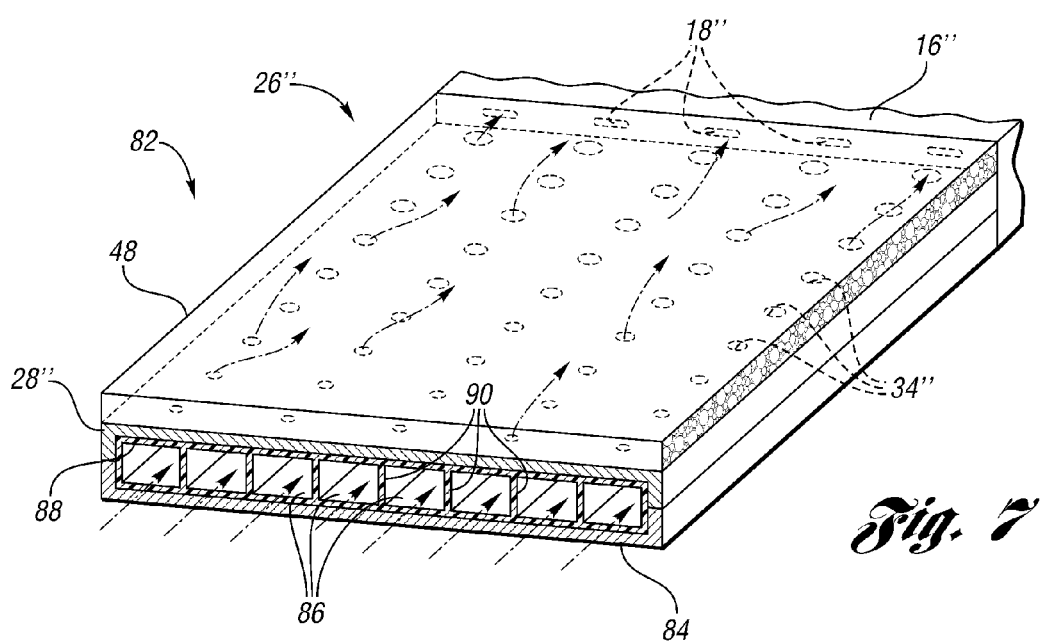
FIG. 7 is a fragmentary perspective view of the electrode arrangement of FIG. 6, with the inlet end of the electrode arrangement removed to show an interior portion of the electrode arrangement.

FIGS. 6 and 7 show an additional embodiment 82 of a bipolar electrode assembly, according to the present disclosure, for use with adjacent first and second cells 11a" and 11b", respectively. The electrode assembly 82 includes a first electrode arrangement, such as a cathode arrangement 26", for use with the first cell 11a" and connected to a second electrode, such as an anode 84, for use with the cell 11b". The cathode arrangement 26" includes a base plate 28" and a flow resistive feature 48 associated with the base plate 28". Similar to the embodiments described above, the base plate 28" has multiple openings 34" that vary in size across the base plate 28".

The electrode assembly 82 also includes one or more inlets 17" for receiving electrolyte from a corresponding electrolyte arrangement, such as an electrolyte arrangement 12, 13 described above in detail. For example, the one or more inlets 17" may be formed in the anode 84 or the base plate 28" of the cathode arrangement 26" such that the electrolyte may be introduced into the cell 11a" between the base plate 28" and the anode 84.

The electrode assembly 82 may also have multiple flow channels 86 that are defined between the base plate 28" and the anode 84. For example, the electrode assembly 82 may include a plastic insert 88 disposed between the base plate 28" and the anode 84 and that has multiple ribs 90 that define the flow channels 86.

With the above configuration, relatively ion rich electrolyte may be introduced into the cell 11a" between the baseplate 28" and the anode 84, and portions of that ion rich electrolyte may flow through the openings 34" as the electrolyte flows from the one or more inlets 17" toward one or more outlets 18" formed in cell housing 16". As result, relatively ion rich electrolyte may be provided to the active side of the base plate 28" (e.g., side adjacent the flow resistive feature 48) along the entire length of the base plate 28".

Furthermore, the openings 34" may be tailored in size based on such factors as flow rate and flow pressure to thereby provide a relatively uniform electrolyte ion concentration gradient across the entire length of the base plate 28". For example, openings 34" proximate the one or more inlets 17", where pressure is relatively higher, may be made smaller than openings 34" proximate the one or more outlets 18", where pressure may be lower.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An energy storage system comprising:
a cell that defines a flow chamber for receiving electrolyte;
an electrode arrangement positioned in the cell and including a plate having first and second sides, and a barrier layer attached to the plate, the plate further having multiple openings that vary in size to facilitate electrolyte flow on both sides of the plate, wherein the plate and the barrier layer define a cavity, and wherein the plate is positioned between the flow chamber and the cavity; and
an electrolyte supply arrangement for supplying the electrolyte to the flow chamber of the cell and on the first side of the plate such that a portion of the electrolyte flows through one or more of the openings in the plate and into the cavity and then from the cavity back through the plate.

2. The energy storage system of claim 1 wherein the electrode arrangement further comprises a flow resistive feature associated with the plate, the flow resistive feature being configured to encourage electrolyte flow through the plate.

3. The energy storage system of claim 2 wherein the flow resistive feature comprises a flow screen positioned adjacent the plate.

4. The energy storage system of claim 2 wherein the flow resistive feature comprises metal foam.

5. The energy storage system of claim 2 wherein the flow resistive feature comprises expanded metal.

6. The energy storage system of claim 5 wherein the flow resistive feature is corrugated.

7. The energy storage system of claim 2 further comprising a separator disposed in the cell adjacent the flow resistive feature, wherein the separator is configured to contact the flow resistive feature during operation of the system to thereby inhibit electrolyte flow between the separator and the flow resistive feature, such that a portion of the electrolyte is urged to pass through the plate of the electrode arrangement.

8. The energy storage system of claim 1 wherein the system is configured such that, during operation, a flow resistive feature develops on the plate.

9. The energy storage system of claim 1 wherein the plate has a width and a length that extends perpendicular to the width and generally in a flow direction of the electrolyte, wherein the openings are generally arranged in rows that extend across the width of the plate, and, for each row, the openings generally have the same size.

10. The energy storage system of claim 9 wherein the openings of one row vary in size compared to openings of an adjacent row.

11. The energy storage system of claim 1 wherein the electrode arrangement further comprises an additional plate attached to the plate such that the barrier layer is disposed between the additional plate and the plate, the additional plate having multiple openings that vary in size to facilitate flow of an additional electrolyte on both sides of the additional plate, wherein the barrier layer is configured to inhibit commingling of the electrolyte and the additional electrolyte, and wherein the plate is configured to function as a cathode, and the additional plate is configured to function as an anode.

12. An energy storage system comprising:
a cell that defines a flow chamber for receiving electrolyte, the cell having an inlet for introducing the electrolyte into the flow chamber, an outlet for allowing the electrolyte to exit the flow chamber, and a central portion disposed between the inlet and the outlet; and an electrode arrangement positioned in the cell and including a plate having first and second sides, and a flow screen positioned adjacent the plate, the plate further having multiple openings that are tailored to facilitate electrolyte flow from one side of the plate to the other side of the plate to thereby reduce electrolyte concentration gradient from the inlet to the outlet of the cell, wherein the openings proximate the inlet are smaller than the openings proximate the central portion of the cell, and wherein the flow screen is configured to encourage electrolyte flow through the plate.

13. The energy storage system of claim 12 wherein the electrode arrangement further comprises a barrier layer attached to the plate, wherein the plate and the barrier layer define a cavity for receiving a portion of the electrolyte, and wherein the plate is positioned between the flow chamber and the cavity.

14. The energy storage system of claim 13 wherein the barrier layer comprises an additional plate, wherein the plate is configured to function as one of an anode and a cathode, and the additional plate is configured to function as the other of the anode and the cathode.

15. The energy storage system of claim 13 further comprising an electrolyte supply arrangement for supplying the electrolyte to the flow chamber of the cell and on the first side of the plate such that a portion of the electrolyte flows through one or more of the openings in the plate and into the cavity and then from the cavity back through the plate.

16. The energy storage system of claim 12 further comprising an electrolyte supply arrangement for supplying the electrolyte to the flow chamber, wherein the system is configured such that, during operation, a flow resistive feature develops on the plate.

17. The energy storage system of claim 16 wherein the flow resistive feature comprises metal.

18. An electrode arrangement for use with an energy storage system having a cell that defines a flow chamber for receiving electrolyte, the electrode arrangement comprising:
    a plate that is positionable in the cell, the plate having first and second sides and multiple openings that vary in size such that the plate is configured to facilitate electrolyte flow on both sides of the plate when the plate is positioned in the cell; and
    a barrier layer attached to the plate and comprising an additional plate;
    wherein the plate and the barrier layer define a cavity for receiving a portion of the electrolyte, the plate is positioned between the flow chamber and the cavity, the plate is configured to function as one of an anode and a cathode, and the additional plate is configured to function as the other of the anode and the cathode.

19. The electrode arrangement of claim 18 further comprising a flow resistive feature associated with the plate, the flow resistive feature being configured to encourage electrolyte flow through the plate.

20. The electrode arrangement of claim 19 wherein the flow resistive feature comprises a flow screen positioned adjacent the plate.

21. The electrode arrangement of claim 19 wherein the flow resistive feature comprises metal foam.

22. The electrode arrangement of claim 19 wherein the flow resistive feature comprises expanded metal.

23. The electrode arrangement of claim 22 wherein the flow resistive feature is corrugated.

24. An energy storage system comprising:
    a cell that defines a flow chamber for receiving electrolyte, the cell having an inlet for introducing the electrolyte into the flow chamber, an outlet for allowing the electrolyte to exit the flow chamber, and a central portion disposed between the inlet and the outlet; and
    an electrode arrangement positioned in the cell and including a plate having first and second sides, and a flow resistive feature associated with the plate and comprising metal foam, the plate further having multiple openings that are tailored to facilitate electrolyte flow from one side of the plate to the other side of the plate to thereby reduce electrolyte concentration gradient from the inlet to the outlet of the cell, wherein the openings proximate the inlet are smaller than the openings proximate the central portion of the cell, and wherein the flow resistive feature is configured to encourage electrolyte flow through the plate.

* * * * *